United States Patent [19]

Maruyama

[11] Patent Number: 4,948,233
[45] Date of Patent: Aug. 14, 1990

[54] BEAM SHAPING OPTICAL SYSTEM
[75] Inventor: Koichi Maruyama, Tokyo, Japan
[73] Assignee: Asahi Kogaku Kogyo Kabushiki Kaisha, Tokyo, Japan
[21] Appl. No.: 212,613
[22] Filed: Jun. 28, 1988

Related U.S. Application Data

[63] Continuation of Ser. No. 702,737, Feb. 19, 1985, abandoned.

[30] Foreign Application Priority Data

Feb. 20, 1984 [JP] Japan .................................. 59-30887
Mar. 12, 1984 [JP] Japan .................................. 59-46748

[51] Int. Cl.$^5$ ............................................. G02B 5/04
[52] U.S. Cl. ..................................... 350/421; 350/286
[58] Field of Search .............................. 350/421, 286

[56] References Cited

U.S. PATENT DOCUMENTS 2,406,798  9/1946  Burroughs ........................ 350/286
4,643,538  2/1987  Wilson ............................. 350/421

FOREIGN PATENT DOCUMENTS 0537799    1/1956  Italy ................................ 350/421
50-147341  11/1975 Japan .

OTHER PUBLICATIONS

Besse, "Expansion of Laser Beam in Only One Dimension", Applied Optics, vol. 7, No. 11, 11/1968, p.2322.

Primary Examiner—Bruce Y. Arnold
Assistant Examiner—Rebecca Gass
Attorney, Agent, or Firm—Finnegan, Henderson, Farabow, Garrett, and Dunner

[57] ABSTRACT

Herein disclosed is a parallel beam shaping optical system which is an afocal anamorphic optical system. The optical system comprises two prisms for shaping a bundle of beams in a desired direction. The optical system is constructed so that an incident light is in parallel to the emergent light. Two shaping optical sub-systems each composed of the above-described optical system may be combined with each other to obtain a desired shaping of a ray of light.

9 Claims, 8 Drawing Sheets

BEAM SHAPING OPTICAL SYSTEM

This is a continuation of application Ser. No. 702737 filed Feb. 19, 1985, now abandoned.

BACKGROUND OF THE INVENTION

This invention relates to an optical system for shaping the sectional configuration of a light parallel beam.

Emergent rays from a semiconductor laser are different in divergent angle. Therefore, in the case where a bundle of parallel rays is obtained by using a rotationally symmetric collimator lens, emergent rays from the collimator lens are elliptical in intensity distribution.

Therefore, in order to use the laser beam efficiently and to focus it into a spot which is rotationally symmetric in intensity distribution, it is a required to use the afocal anamorphic optical system in which the wavefront aberration has been sufficiently corrected.

Also, in the case of a laser beam circular in section, sometimes it is required to use for a laser beam printer optical system an afocal anamorphic optical system in which for instance the height-width ratio of the laser beam applied to the image forming lens is changed to thereby change resolving powers in horizontal and vertical direction into desired values.

In a conventional afocal anamorphic optical system used for the above-described purposes, two cylindrical lenses are employed, or one or two prisms are used. However, the conventional afocal anamorphic optical system is disadvantageous as follows:

In the afocal anamorphic optical system using two cylindrical lenses, the plane wave is applied to the cylinder surface, and therefore the occurrence of aberration cannot be avoided. Accordingly, in designing an optical system using cylindrical lenses, aberration correcting means are employed to totally negate aberration due to more than one surface as much as possible. However, the afocal anamorphic optical system using a single prism suffers from the difficulty that a large wavefront aberration remains uncorrected if the cylindrical axes of the surfaces to be corrected are even slightly not in alignment with each other. Accordingly the machining and mounting accuracy of the cylindrical lenses requires severe tolerances.

On the other hand, the afocal anamorphic optical system is advantageous in that no aberration takes place because the plane wave is incident on a planar surface. However, in the above optical system, the angle of the bundle of incident rays is deviated from that of the bundle of emergent rays. This will become a disadvantage in designing optical systems.

Figure 1:
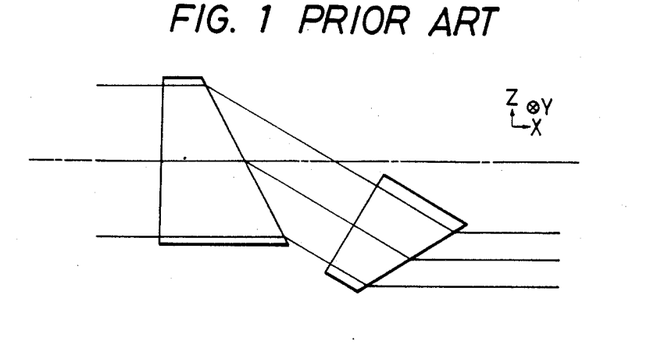
FIG. 1 is a sectional view of a conventional beam shaping optical system with two prisms.

This disadvantage can be eliminated by a beam shaping optical system which uses two prisms as shown in FIG. 1. In the optical system, of FIG. 1 the bundle of incident rays is parallel to with the bundle of emergent rays. However, the optical system is still disadvantageous in that the system on the incident side which is disposed before the optical system and the system on the emergent side which is disposed after the optical system must be arranged with the optical axes of the two systems from one another in the same plane.

SUMMARY OF THE INVENTION

An object of this invention is to eliminate the above-described difficulties accompanying a conventional beam shaping optical system. More specifically, an object of the invention is to provide a beam shaping optical system in which the optical axis of the system on the incident side is in alignment with that of the system on the emergent side, and the machining and the mounting accuracy requirements with respect to the wavefront aberration are not severe.

Provided according to the invention is a parallel beam shaping optical system which is an afocal anamorphic optical system comprising two prisms which, when applied with a parallel beam, acts to increase or decrease an emergent beam which in a direction, and in which an incident light is in parallel with the emergent light thereof when the incident light is applied to one surface of said optical system at a predetermined angle, and when an incident light is applied at the predetermined angle, the effective aperture of the optical system has an incident point with which one incident ray and the emergent ray thereof form one straight line.

DETAILED DESCRIPTION OF THE PREFERRED EMBODIMENTS

Figure 2A:
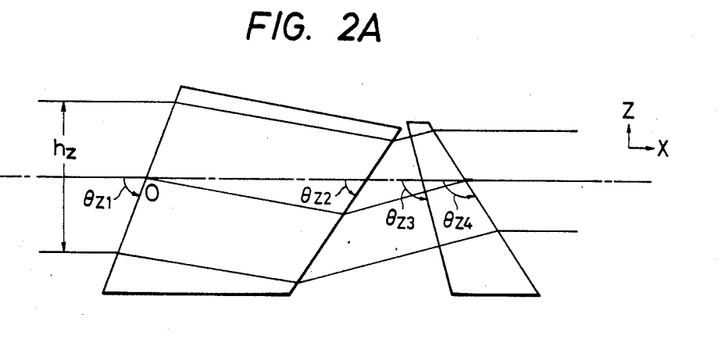
FIGS. 2A and 2B show a first example of a beam shaping optical system according to this invention, FIG. 2A being a sectional view of the optical system taken along the X-Z plane and FIG. 2B being a sectional view of the system taken along the X-Y plane.
Figure 2B:
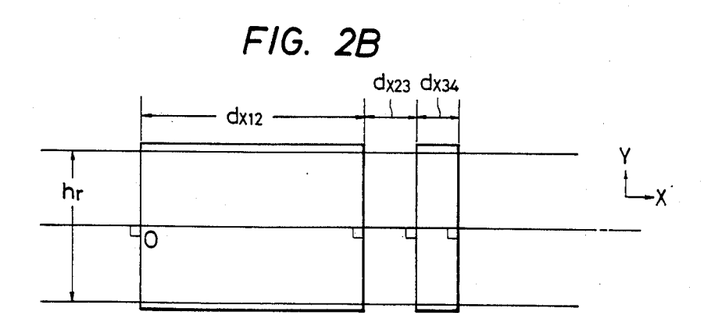
Figure 3A:
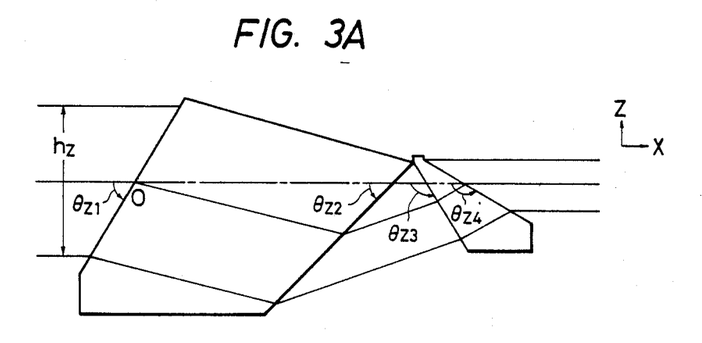
FIGS. 3A and 3B show a second example of the beam shaping optical system according to the invention, FIG. 3A being a sectional view of the optical system taken along the X-Z plane and FIG. 3B being a sectional view of the same taken along the X-Y plane.
Figure 3B:
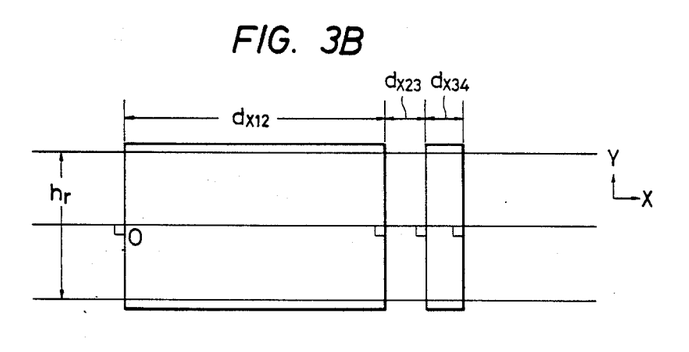

The beam shaping optical system according to the invention, when used to decrease a beam width, has arrangements as shown in FIGS. 2A and 2B (a first example) and FIGS. 3A and 3B (a second example). In these figures, FIGS. 2A and 3A are sectional views in an X-Z plane, and FIGS. 2B and 3B are sectional views in an X-Y plane.

In each of FIGS. 2A, 2B, 3A and 3B, the Z-direction is the coordinate in which the beam width changes when the optical system is used having an incident angle chose such that incident light is in parallel with its emergent light. In the Y-direction, a beam width is kept unchanged. The X-direction is the direction of the incident beam. The midpoint, in the Y-direction, of the effective aperture is the origin in the Y-direction. In the X-Z plane, the incident point with which one incident ray and its emergent ray are in one line is employed as the origin of the X- and Z-axes.

These optical systems are designed so as to meet the following conditions:

(1) $\theta_{z1} = 90°$
(2) $(90° - \theta_{z2})/(90° - \theta_{z1}) \gg 1$
(3) $(90° - \theta_{z4})/(90° - \theta_{z1}) < 0$ where $\theta_{z1}$ through $\theta_{z4}$ are the angles which are formed between the X-axis and surfaces of the prisms.

The conditions (1) through (3) are the fundamental ones for forming the optical system with two prisms. Because of the conditions (1) and (2), an incident light advances along an L-shaped or inverted-L-shaped optical path, the nonparallelism between the main ray of an incident light and the main ray of an emergent light can be minimized, and the incident point with which one incident ray and its emergent ray in one line can be provided in the aperture of the prism. The condition (3) is to set a beam width changing magnification to a practical value.

If the following conditions (4) and (5) are added to the above-described conditions (1) through (3), then the main ray of the incident light can be aligned with the incident point described above, and it is possible to form the system which car zero the deviation between the optical axis of the system on the incident side and that of the system on the emergent side which is due to the addition of the beam shaping optical system.

(4) $d_{x12} / h_z > 0.8$
(5) $d_{x12} / (d_{x23} + d_{x34}) > 1$ where $h_z$ is the incident light height, in the Z-direction, on the incident surface, and $d_{x12}$ through $d_{x34}$ are the distances along the X-axis between the adjacent surfaces of the respective prisms.

The data of the first and second examples of the beam shaping optical system are as follows:

| First Example (FIGS. 2A and 2B) | |
|---|---|
| $\theta_{z1}$ | 70.000° |
| $\theta_{z2}$ | 56.200° |
| $\theta_{z3}$ | 105.090° |
| $\theta_{z4}$ | 122.435° |
| $d_{x12}$ | 13.30 |
| $d_{x23}$ | 3.20 |
| $d_{x34}$ | 2.60 |
| $h_z$ | 9.00 |
| $h_x$ | 9.00 |

Wavelength employed ... 632.8 mm
Medium refractive index ... 1.00000
First Prism refractive index ... 1.79884
Second Prism refractive index ... 1.79884
Beam width changing rate ... 1 : 1.5

| Second Example (FIGS. 3A and 3B) | |
|---|---|
| $\theta_{z1}$ | 60.0° |
| $\theta_{z2}$ | 45.7° |
| $\theta_{z3}$ | 121.3° |
| $\theta_{z4}$ | 149.4° |
| $d_{x12}$ | 15.60 |
| $d_{x23}$ | 2.16 |
| $d_{x34}$ | 2.40 |
| $h_z$ | 9.00 |
| $h_x$ | 9.00 |

Wavelength employed ... 632.8 mm
Medium refractive index ... 1.00000
First Prism refractive index ... 1.79884
Second Prism refractive index ... 1.51462
Beam width changing rate ... 1 : 3.0

In the first and second examples the X-axis is at the center of the Z-direction effective aperture; however, it is not always necessary that the effective aperture of the beam shaping optical system be symmetrical with respect to the X-axis. When the system is not symmetrical, it can be used as a beam shaping optical system in which, when the bundle of incident rays is small in width, the optical axis of the system on the incident side is aligned with the optical axis of the system on the emergent side, and when the bundle of incident rays is large in width, the optical axes are scarcely shifted from each other. When, even in the case where the bundle of incident rays is large in width, the emergent light is used without any loss of light caused by blocking the light path, because the effective diameter of the lens system on the incident side is large, the system can be used without affecting its effect on the increasing or decreasing of the resolving power.

Figure 4:
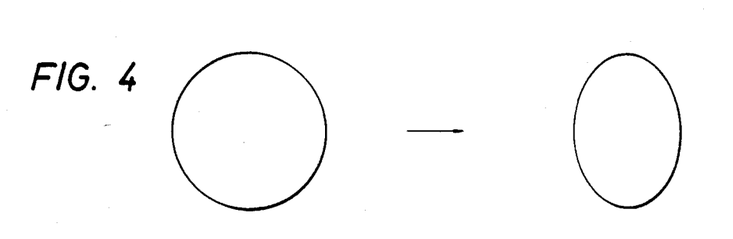
FIG. 4 shows an example of the beam pattern conversion achieved by the optical system according to the invention, the beam pattern conversion achieved by the first example of the optical system according to the invention.

FIG. 4 shows an example of the beam pattern conversion by the first example of the optical system.

In a beam shaping optical system above two prisms are used to shape a light beam. It is, however, noted that the optical system suffers from the difficulty that the beam width changing magnification cannot be increased without increasing the size of the optical system to some extent. That is, in order to increase the beam width changing magnification, the size of the optical system must be increased not only in the beam advancing direction but also in the beam width changing direction.

Therefore, sometimes it is unsuitable to add the beam shaping optical system to an existing optical system.

On the other hand, in another beam shaping optical according to the invention, at least one reflection surface is formed on the lower backface of a prism on the side where the beam width is decreased, namely, a prism arranged on the right-handed side of each of FIGS. 5A to 6B, so as to eliminate the difficulty that the size of a beam shaping optical system is increased by the provision of a reflection surface. Thus, although the beam shaping optical system is small both in the number of components and in size than other beam shaping optical systems, it can provide the above-described effects similarly. The effect of miniaturization according to the invention should be highly appreciated especially in manufacturing a beam shaping optical system with a high beam-width-changing magnification.

The other examples of a beam shaping optical system according to the invention will be described.

In these examples, similarly to the foregoing examples:

$\theta_{zn}$ is the angle between the X-axis and the line of intersection of the n-th surface and the X-Z plane, $d_{xnm}$ is the distance, along the X-axis, between the n-th surface and the m-th surface, $d_{znm}$ is the distance, along the Z-axis, between the n-th surface and the m-th surface, and $d_{zom}$ is the distance, along the Z-axis, between the original point $\bar{o}$ and the m-th surface.

| Third Example (FIGS. 5A and 5B) | | |
|---|---|---|
| $\theta_{z1}$ | 90.000° | |
| $\theta_{z2}$ | 121.166° | |
| $\theta_{z3}$ | 53.632° | |
| $\theta_{z4}$ | 0° | The fourth surface is in parallel with the X-axis. |
| $\theta_{z5}$ | 157.534° | |
| $d_{x23}$ | 0.80 | |
| $d_{z04}$ | 0.60 | |
| $d_{x35}$ | 0.83 | |
| $h_z$ | 1.00 | |
| $h_y$ | 1.00 | |

Figure 5A:
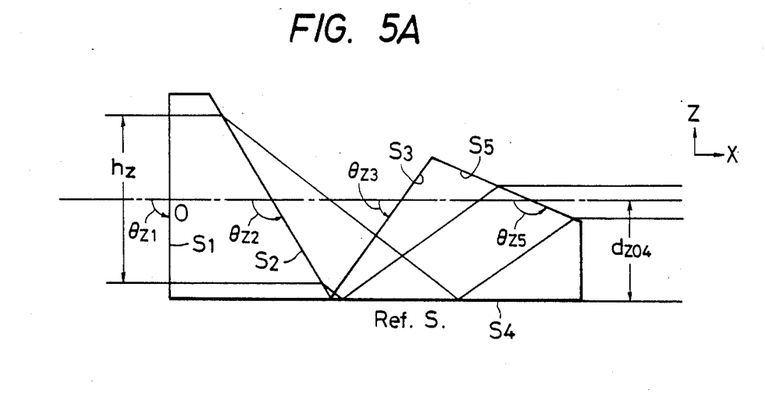
FIGS. 5A and 5B show a third example of another beam shaping optical system according to the invention, FIG. 5A being a sectional view of the optical system taken along the X-Z plane, and FIG. 5B being a sectional view of the system taken along the X-Y plane.
Figure 5B:
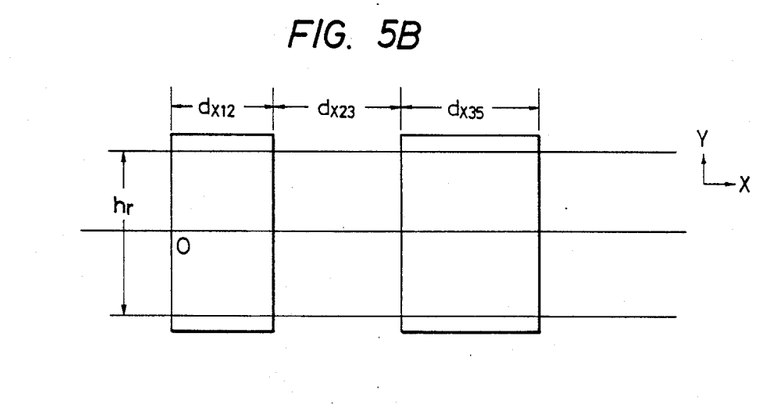

The first through fifth surfaces are perpendicular to the X-Z plane.
The fourth surface is a reflection surface.
Wavelength used—632.8 nm
Medium refractive index—1.00000
Prism refractive index—1.79884
Beam width changing rate—1 : 5.0

| Fourth Example (FIGS. 6A and 6B) | |
|---|---|
| $\theta_{z1}$ | 90.000° |
| $\theta_{z2}$ | 125.680° |
| $\theta_{z3}$ | 63.623° |
| $\theta_{z4}$ | 27.943° |
| $\theta_{z5}$ | 27.943° |
| $d_{x23}$ | 0.68 |
| $d_{x34}$ | 1.27 |
| $d_{z45}$ | 0.84 |
| $h_z$ | 1.00 |
| $h_y$ | 1.00 |

Figure 6A:
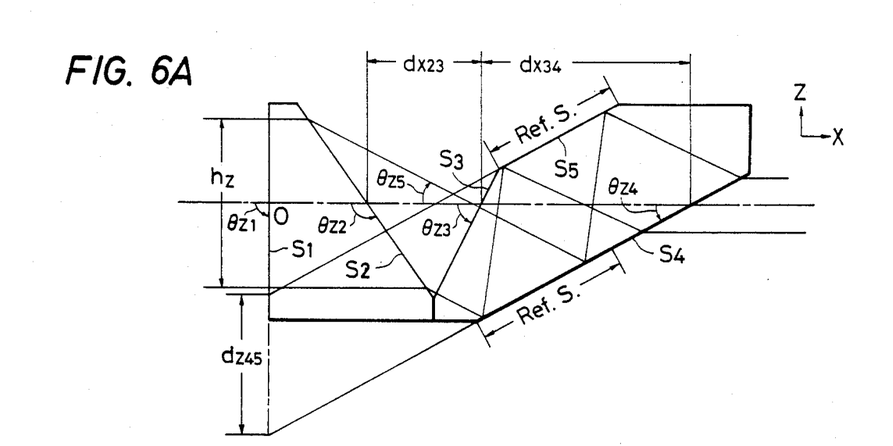
FIGS. 6A and 6B show a fourth example of the beam shaping optical system according to the invention, FIG. 6A being a sectional view of the optical system taken along the X-Z plane and FIG. 6B being a sectional view of the system taken along the X-Y plane.
Figure 6B:
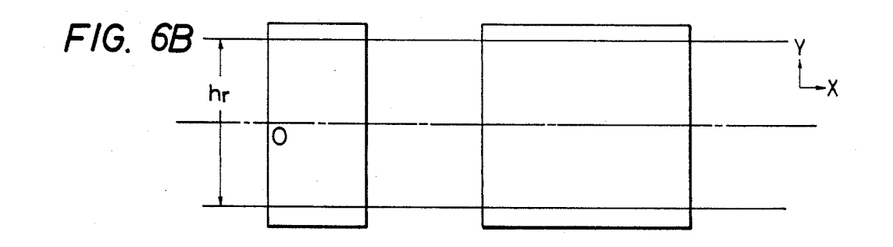

The first through fifth surfaces are perpendicular to the X-Z plane. The fourth surface includes a reflection surface as indicated in FIGS. 6A and 6B and the remaining area of the fourth surface is a transmission surface; that is, the fourth surface is used for reflection and transmission.

The fifth surface is a reflection surface.
Wavelength used—632.8 nm
Medium refractive index—1.00000
Prism refractive index—1.51462
Beam width changing rate—1 : 3.0

| Fifth Example (FIGS. 7A and 7B) | | |
|---|---|---|
| $\theta_{z1}$ | 70.000° | |
| $\theta_{z2}$ | 110.440° | |
| $\theta_{z3}$ | 69.215° | |
| $\theta_{z4}$ | 0° | The fourth surface is in parallel with the X-axis. |
| $\theta_{z5}$ | 151.225° | |
| $d_{x12}$ | 0.60 | |
| $d_{x23}$ | 0.60 | |
| $d_{x35}$ | 1.70 | |
| $d_{z04}$ | 0.80 | |
| $h_z$ | 1.00 | |
| $h_y$ | 0.33 | |

Figure 7A:
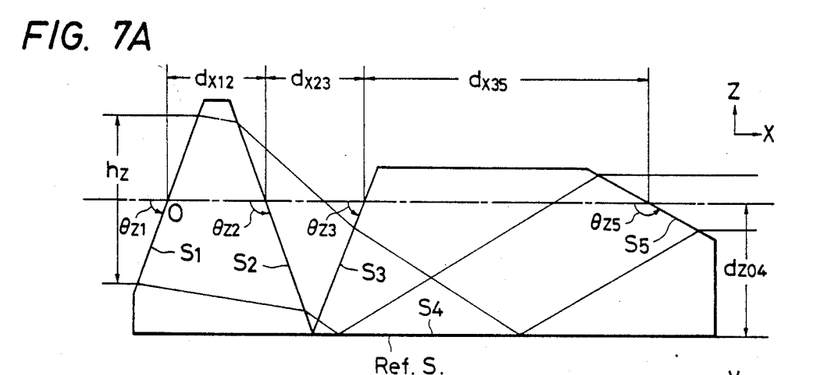
FIGS. 7A and 7B show a fifth example of the beam shaping optical system according to the invention, FIG. 7A being a sectional view of the optical system taken along the X-Z plane and FIG. 7B being a sectional diagram of the system taken along the X-Y plane.
Figure 7B:
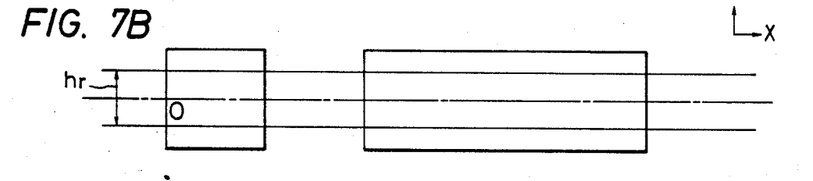

The first through fifth surfaces are perpendicular to the X-Z plane.
The fourth surface is a reflection surface.
Wavelength employed—780 nm
Medium refractive index—1.00000
Prism refractive index—1.798565
Beam width changing rate—1 : 3.0

The third example has one reflection surface, the fourth example has two reflection surfaces, and the fifth example has one reflection surface but does not have any surface to which rays are applied perpendicularly.

Figure 8A:
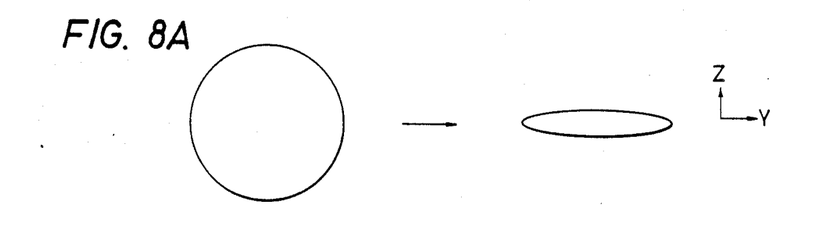
FIGS. 8A to 8C show examples of the beam pattern conversion which is achieved by the optical system according to the invention, FIG. 8A being a diagram showing an example of the beam pattern conversion which is accomplished by the third example of the optical system according to the invention, FIG. 8B being a diagram showing an example of the beam pattern conversion which is carried out by the fourth example of the optical system according to the invention, and FIG. 8C being a diagram showing an example of the beam pattern conversion which is achieved by the fifth example of the optical system according to the invention.
Figure 8B:
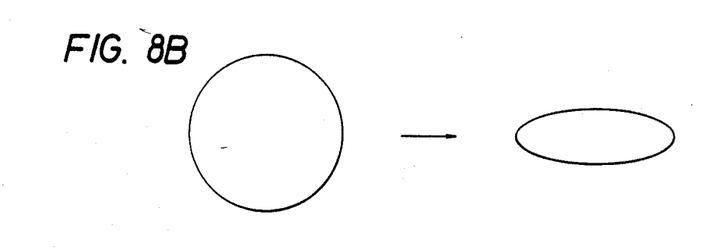
Figure 8C:
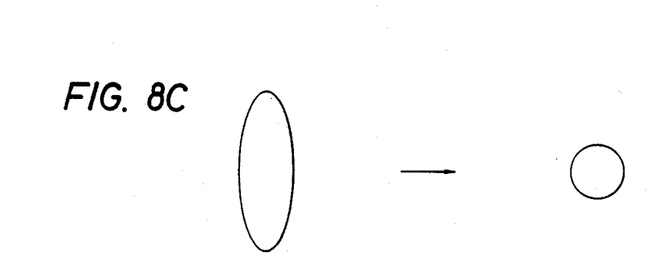

FIG. 8A shows an example of a beam pattern conversion by the third example of the beam shaping optical system, FIG. 8B shows an example of a beam pattern conversion by the fourth example of the beam shaping optical system, and FIG. 8C shows an example of a beam pattern conversion by the fifth example of the beam shaping optical system.

As in the first and second examples, also in the third to fourth examples, it is obvious that, if the beam shaping optical system is used in the opposite direction, it is possible to increase the beam width.

In the third and fourth examples, a light beam is applied perpendicularly to the first and third surfaces, while in the fifth example, there is no such perpendicular incident surface. This is due to the difference between laser beams used. That is, the third and fourth examples are used for He-Ne laser beams, and have the perpendicular incident surfaces to utilize light which is returned through reflection, thereby to simplify the alignment of the optical axes in the assembling work. On the other hand, a semiconductor laser has a property that, when a return light beam is returned to the semiconductor laser, the latter becomes unstable in operation, thus increasing noise. Therefore, it is essential for the semiconductor laser to prevent the phenomenon that a light beam reflected by the perpendicular incident surface is returned to the light emitting point advancing along the former optical path in the opposite direction. Accordingly, for a semiconductor laser beam shaping optical system it is important not only to use reflection preventing coatings but also to prevent the perpendicular incidence of a light beam to the surface. Hence, the fifth example of the beam shaping optical system which is used for semiconductor laser beams is so designed as to have no perpendicular incident surface.

While the beam shaping optical system has been described with reference to the case where it is used to decrease the width of the incident light, it is obvious that, if the beam shaping optical system is used in the opposite direction, it is possible to increase the beam width.

If two beam shaping optical systems according to the invention are used in such a manner that the directions in which the beam width changing actions are effected are in alignment with each other, then the resultant changing magnification is the product of the changing magnifications of the optical systems. This method is effective in eliminating the difficulty that, in the case of one high magnification beam shaping optical system, the incident angle of rays to the prism is excessively large, thus increasing the loss of rays due to reflection. If, even when the changing magnification is not large, it is required to change the magnification as in an experimental apparatus, several beam shaping optical systems different in magnification according to the invention are provided, then the magnification can be finely controlled by combining them suitably.

If two beam shaping optical systems according to the invention are combined in such a manner that they are turned in the Y-Z plane around the X-axis, then the ratio of the width, in the direction of the major axis, of the beam configuration to the width, in the direction of the minor axis, of the same can be continuously changed.

Figure 9A:
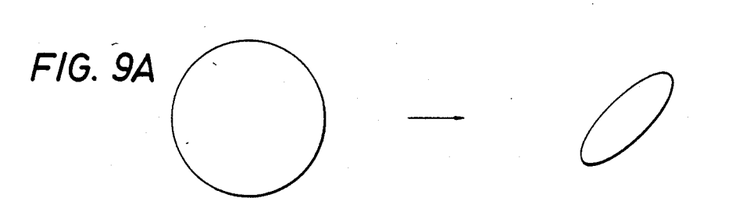
FIG. 9A is a diagram showing an example of the beam pattern conversion which is accomplished by the combination of the first and second examples of the optical system with a rotational angle of 45° in the Y-Z plane.
Figure 9B:
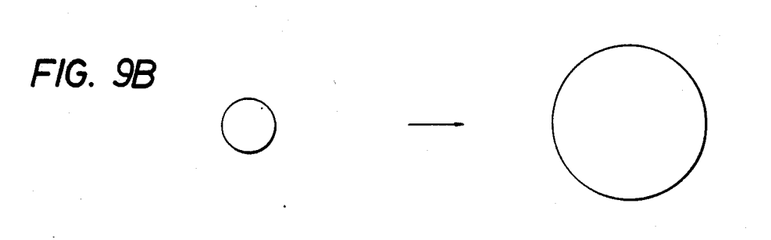
FIG. 9B is a diagram showing an example of the beam pattern conversion which is achieved by combining two second examples of the optical system in such a manner that they are set to enlarge the beam, with a rotational angle 90°.
Figure 10A:
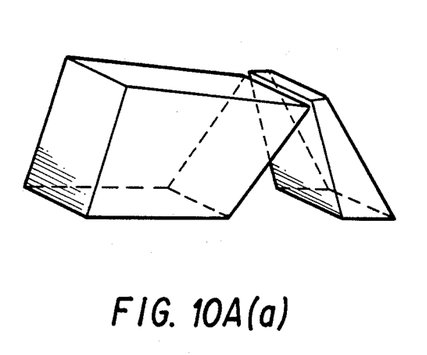
FIGS. 10A and 10B show isometric views of two combinations of optical systems, each being comprised of two subsystems of the three subsystems shown.
Figure 10B:
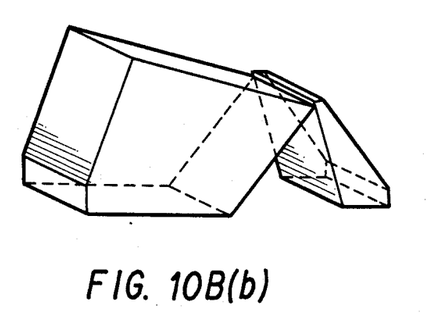

FIG. 9A shows the case where the first example, i.e., the optical system having a magnification of 1/1.5 and the second example, i.e., the optical system having a magnification of ⅓ are combined together with a rotational angle of 45°. The systems thus combined can change the ratio of major axis to minor axis continuous from 4.5 : 1 with a rotational angle 0° to 2 : 1 with a rotational angle 90°. Especially when the optical systems having the same magnification are combined together with a rotational angle 90°, an aberrationless isotropic beam enlarging (or reducing) system can be provided. FIG. 9B shows an example of the beam pattern conversion which is obtained by combining the optical systems having a magnification of ⅓ of the second example in such a manner that they are set to increase the beam width, with a rotational angle of 90°.

The invention further comprises a parallel beam shaping optical system wherein an incident light to the optical system is in straight relation with an emergent light by selecting at least two from the following subsystems:

(a) A first subsystem which is an afocal anamorphic optical system, comprising two prisms which, when applied with a parallel beam, act to increase or decrease an emergent beam width in a predetermined direction. An incident light is in parallel with the emergent light thereof when the incident light is applied to one surface of the first subsystem at a predetermined angle, and when an incident light is applied at the last-mentioned predetermined angle, an effective aperature of the first subsystem has an incident point with which one incident ray and the emergent ray thereof form one straight line;

(b) A second subsystem which is an afocal anamorphic optical system, comprising two prisms at least one of which has a backface employed as a reflection surface, which, when applied with a parallel beam, acts to increase or decrease an emergent beam width in a predetermined direction. An incident light is in parallel with the emergent light thereof when the incident light is applied to one surface of said second subsystem at a predetermined incident angle, and when incident light is applied at the predetermined incident angle, an effective aperature of the second subsystem has an incident point with which one incident ray and the emergent ray thereof form one straight line; and (c) A third subsystem which is disposed along one straight line, comprising two prisms at least one of which has a backface employed as a reflection surface, which, when applied with a parallel beam, acts to increase or decrease an emergent beam width in a predetermined direction. An incident light is in parallel with the emergent surface of the third system at a predetermined incident angle, and when incident light is applied at the predetermined incident angle, an effective aperture of the third subsystem has an incident point with which one incident ray and the emergent ray thereof form one straight line, wherein when an incident light is applied at the predetermined incident angle so that the incident light is parallel with the emergent light thereof, the third subsystem has no surface to which incident rays are applied perpendicularly.

As is apparent from the above description, in the beam shaping optical system according to the invention, the optical axis of the system on the incident side is in alignment with the optical axis of the system on the emergent side, and the machining and mounting accuracy with respect to the wavefront aberration is not severe. Furthermore, by using more than one beam shaping optical system of the invention in combination, the changing magnification and the beam width ratio can be readily varied.

Especially, by adding the optical system of the invention to an existing optical system such as a laser beam printer optical system, its resolving power can be changed without adjusting the components of the existing optical system.

What is claimed is:

1. An afocal anamorphic optical system for shaping a beam of light, comprising:

a first prism having a first face adapted to receive an incident light beam including an incident ray, and a second face positioned relative to said first face and operative to refract the light beam, the incident ray defining an optical axis and a first angle with said first face, the optical axis defining a second angle with said second face, the light beam having a first maximum width, defined by a distance from the optical axis in a first plane perpendicular to said first face and containing the optical axis; and a second prism having a third face, defining a third angle with the optical axis, positioned relative to said second face and operative to receive the light beam refracted from said second face, and a fourth face, defining a fourth angle with the optical axis, positioned relative to said first face and operative to refract the light beam to define an emergent light beam including an emergent ray comprising light from the incident ray, the emergent ray comprising light from the incident ray, the emergent ray disposed colinear with said optical axis, the emergent beam having a second maximum width, unequal to said first width, defined by a distance from said optical axis in said first plane.

2. An optical system according to claim 1, wherein said first angle is $0_{z1}$ said second angle is $0_{z2}$, and said fourth angle is $0_{z4}$; wherein (a) $0_{z1} = 90°$;

(b) $(90° - 0_{z2})/(90° - 0_{z1}) > 1$; and (c) $(90° - 0_{z4})/(90° - 0_{z1}) < 0$.

3. An optical system according to claim 2, wherein said first prism has a width $d_{x12}$ measured between said first and second faces in a 2nd plane perpendicular to the first plane and containing the optical axis; wherein said second and third faces are separated by a distance $d_{x23}$ in a second plane; wherein said second prism has a width $d_{x34}$ measured between said third and fourth faces in the second plane; wherein said first maximum width $h_z$; and wherein (a) $d_{x12}/h_z > 0.8$, and (b) $d_{x12}/(d_{x23}+d_{x34}) > 1$.

4. An optical system according to claim 1, wherein said second prism further comprises a reflecting surface positioned relative to said third and fourth faces and operate to reflect the beam received by said third face toward said fourth face, said reflecting surface disposed perpendicular to the first plane and parallel to the optical axis.

5. An optical system according to claim 1, wherein said second prism further comprises first and second parallel reflecting surfaces disposed perpendicular to the first plane, said first reflecting surface disposed relative to said third face and operative to reflect the beam received by said third face toward said second reflecting surface, said second reflecting surface disposed relative said first surface and said fourth face and operative to reflect the beam from said first reflecting surface to said fourth face.

6. An optical system according to claim 1, wherein said first angle is not 90°, and wherein the beam received by said third face defines an angle with the third face not equal to 90°.

7. An afocal anamorphic optical system for shaping a beam of light, comprising at least two subsystems selected from the group consisting of:

(a) a subsystem including a first prism having a first face adapted to receive an incident light beam including an incident ray, and a second face positioned relative to said first face and operative to refract the light beam, the incident ray defining an optical axis and a first angle with said first face, the optical axis defining a second angle with said second face, the light beam having a first maximum width, defined by a distance from the optical axis in a first plane perpendicular to said first face and containing the optical axis; and a second prism having a third face, defining a third angle with the optical axis, positioned relative to said second face and operative to receive the light beam refracted from said second face, and a fourth face, defining a fourth angle with the optical axis, positioned relative to said first face and operative to refract the light beam to define an emergent light beam including an emergent ray comprising light from the incident ray, the emergent ray disposed colinear with said optical axis, the emergent beam having a second maximum width, unequal to aid first width, defined by a distance from said optical axis in said first plane;

(b) a subsystem including the elements of said subsystem (a), wherein said second prism further comprises a reflecting surface positioned relative to said third and fourth faces and operative to reflect the beam received by said third face toward said fourth face, said reflecting surface disposed perpendicular to the first plane and parallel to the optical axis; and (c) a subsystem including the elements of the subsystem (a) wherein said second prism further comprises first and second parallel reflecting surfaces disposed perpendicular to the first plane, said first reflecting surface disposed relative to said third face and operative to reflect the beam received by said third face toward said second reflecting surface, said second reflecting surface disposed relative said first surface and said fourth face and operative to reflect the beam from said first reflecting surface to said fourth face.

8. An optical system according to claim 7 comprising first and second subsystems, wherein said optical axis of the first subsystem is colinear with said optical axis of the second subsystem; and wherein said first plane of the first subsystem is not coplanar with said first plane of the second subsystem.

9. An optical system according to claim 8, wherein said first plane of the first subsystem is perpendicular to said first plane of the second subsystem.

* * * * *